United States Patent

[11] 3,620,768

| [72] | Inventor | Edgar A. Corbin, Jr. |
| | | Somerset, N.J. |
| [21] | Appl. No. | 814,454 |
| [22] | Filed | Apr. 8, 1969 |
| [45] | Patented | Nov. 16, 1971 |
| [73] | Assignee | Diamond Shamrock Corporation |
| | | Cleveland, Ohio |

[54] CHEESE MANUFACTURE
8 Claims, No Drawings

| [52] | U.S. Cl. | 99/116 |
| [51] | Int. Cl. | A23c 19/02 |
| [50] | Field of Search | 99/116, 117, 54 |

[56] References Cited
UNITED STATES PATENTS

| 2,982,654 | 5/1961 | Hammond et al. | 99/116 |
| 3,172,767 | 3/1965 | Foster, Jr. et al. | 99/116 |
| 3,340,066 | 9/1967 | Corbin, Jr. et al. | 99/54 |

Primary Examiner—Lionel M. Shapiro
Assistant Examiner—D. M. Naff
Attorneys—C. Thomas Cross, Roy Davis, Timothy E. Tinkler, John J. Freer, Sam E. Laub, Neal T. Levin, Leslie G. Nunn, Jr. and Helen P. Brush ABSTRACT: Cheese curd is manufactured by acidifying cold milk with free acid, heating to 80° F., adding acidogen and proteolytic enzyme, allowing cheese curd to form, cutting and cooking curd for about 1 hour. Cottage cheese can be produced in standard dairy equipment without using bacterial fermentation or other time consuming steps.

CHEESE MANUFACTURE

BACKGROUND OF THE INVENTION

This invention relates to cheesemaking and more particularly to a rapid method for producing cheese, e.g., cottage cheese in standard dairy equipment without using bacterial fermentation or other time-consuming steps.

Processes for preparing cheese from chemically acidified milk which avoid fermentation have been attempted. However, these have many disadvantages. Such processes are either carried out at low temperatures or require that the chemically acidified milk be heated in special equipment. Low temperatures greatly increase processing costs in that longer time cycles and larger quantities of reagents, e.g., acids, proteolytic enzymes and the like are required. Heating of acidified milk in special equipment is time consuming and unsatisfactory because the milk must be heated in a quiescent state. The acidified milk is either heated with external heating elements or with heating elements inserted directly into the acidified milk. Either type of heating is prohibitively slow and is not economical.

It is an object of the present invention to provide a rapid method for producing cheese in standard dairy equipment without using bacterial fermentation or other time-consuming steps. Another object is to provide an economical method for producing cheese. A further object is to provide an improved method for producing cottage cheese. Still another object is to provide an improved method for producing baker's cheese. Another object is to provide improved methods for producing cream cheese and Neufchatel cheese. A further object is to provide an improved method for producing cheese using acids, acidogens, proteolytic enzymes and the like. Other objects of this invention will become apparent from the detailed description given herein. However, it is intended that the detailed description and specific examples do not limit this invention but merely indicate preferred embodiments thereof.

SUMMARY OF THE INVENTION

The objects of this invention are accomplished in the following manner. A rapid and economical method for producing cheese has been discovered. Cheese such as cottage cheese, baker's cheese, cream cheese and Neufchatel cheese can be produced in standard dairy equipment without using bacterial fermentation or other time-consuming steps. The method involves (a) acidifying cooled milk, i.e., milk maintained at temperatures of about 32° F. to about 45° F., by addition of free acid until a pH of between about 4.88 to about 5.20 is reached, (b) heating the cooled, acidified milk to just in excess of 60° F. to about 100° F. for about 30 minutes to about 90 minutes, (c) adding acidogen and proteolytic enzyme to the heated, acidified milk, (d) allowing the heated acidified milk containing the acidogen and enzyme to remain in a quiescent state to just in excess of 60° F. to about 100° F. for about 30 minutes to about 90 minutes so that a cuttable cheese curd is formed, and thereafter (e) cutting, cooking, draining and washing the resulting curd to obtain the desired cheese. The invention is particularly suited to making cheese curd at the lower pH ranges, i.e., below pH 4.88, which includes cheese curds for cottage cheese, baker's cheese, cream cheese and Neufchatel cheese.

DESCRIPTION OF THE PREFERRED EMBODIMENTS

This invention can be used to manufacture cottage cheese, baker's cheese, cream cheese, Neufchatel cheese and the like from milk. By milk is meant fresh skim milk, skim milk having about 1–4 percent by weight or more added NFMS (Grade A, Low Heat, nonfat-milk-solids), whole milk, milk-cream mixtures, half milk and half cream, reconstituted condensed milk, reconstituted powdered milk and the like. Milk is used as a generic term in the present invention and includes medium and high butterfat milk or cream having as much as 20 percent butterfat. The milk is initially acidified with at least one food grade free acid such as lactic acid, phosphoric acid, citric acid, acetic acid, malic acid, sulfuric acid, hydrochloric acid, succinic acid or the like. Initial acidification of the milk is conducted at about 32° F. to about 45° F. with the optimum temperature being about 35° F. to about 40° F. to achieve a pH of about 4.88 to about 5.20 with the optimum pH being about 4.90 to about 5.10. The milk is agitated during and after acid addition to obtain a uniform mixture of acidified milk. Generally, from about 0.3 to about 0.5 parts by weight of acid based on 100 parts by weight of milk is added.

The acidified milk is then heated to just in excess of 60° F. to about 100° F. with the optimum temperature being about 75° F. to about 90° F. and acidogen and proteolytic enzyme are added together or separately in any order. From about 0.1 to about 0.5 parts by weight of acidogen or mixture of acidogens based on 100 parts by weight of milk and from about 0.001 to about 0.05 parts by weight of aqueous proteolytic enzyme solution based on 100 parts by weight of milk are added to the milk. The resulting mixture is agitated during and after acidogen and enzyme additions until uniform. At the temperatures of the process, i.e., in excess of 60° F., both the acid liberated from the acidogen and the action of the proteolytic enzyme bring about coagulation of the milk.

An acidogen such as D-glucono-delta-lactone, the low melting lactide (m.p. 41°–42° C.) of lactic acid, acetic anhydride, heptonolactone (the lactone of glucoheptonic acid) or the like can be used. Preparation of the low melting lactic acid lactide is described in U.S. Pat. No. 2,982,654, Hammond and Deane filed Apr. 6, 1959.

The proteolytic enzyme can be commercial rennin, Rennet, a diluted rennin extract, a pepsin-rennin mixture, a vegetable-derived enzyme clotting agent or the like. Other enzymes such as pepsin, papain and ficin may be used along or in combination with rennin, the preferred enzyme. Rennin is obtained from the stomach of suckling calves. Rennet, a commercial dried extract containing rennin can also be used. See Merck Index, page 911 (Merck & Co., Inc.—1968—8th ed). The Rennet of commerce is usually a solution of the enzyme rennin, stabilized, and with preservatives added and standardized in strength to a certain coagulating or clotting power. Useful commercial aqueous rennin solutions include Hansen's Rennet Extract and Hansen's Cottage Cheese Coagulator available from Inc.—Hansen's Laboratory, Inc. Milwaukee, Wisc.

The heated, acidified milk containing acidogen and enzyme is then allowed to remain in a quiescent state at just in excess of 60° F. to about 100° F. with the optimum temperature being about 75° F. to 90° F. for about 30 minutes to about 90 minutes to obtain a cuttable cheese curd.

The cheese curd is then cut and cooked. It can be cut into large (¾-inch, ⅝-inch ½-inch) or small (⅜-inch or ¼-inch) cubes. The cooking rate in the process of this invention is faster than the cooking rate in the cultured process, that is, about 30 minutes to about 90 minutes compared to about 90 minutes to about 150 minutes. Draining and washing of the cooked curd can be carried out using the standard cheesemaking procedures.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g., ml., ° C., ° F. are used to indicate grams, milliliters, degrees Centigrade and degrees Fahrenheit respectively in these examples.

EXAMPLE I

This example is directed to preparation of cottage cheese curd.

To one gallon of fresh, cold, pasteurized skim milk having a temperature of 45° F. and a pH of 6.80 was added, with stirring, 9.5 ml. of 85 percent food grade phosphoric acid diluted with 20 ml. of water. 9.5 ml. of 85 percent phosphoric acid weighs 16.2 g. and represents 0.41 percent by weight of 85 percent phosphoric acid in one gallon of skim milk (3,900 g.). pH of the acidified milk after phosphoric acid addition and mixing was 5.17. The skim milk was an unfortified skim milk containing about 9 percent by weight total solids and about 0.01 percent by weight butterfat.

The acidified milk was heated for about 30 minutes, with stirring, to 80° F. in a water bath. Temperature of the water bath was regulated so that it did not exceed the milk temperature by more than 20° F. to 30° F. While heating the milk, 2 ml. of Starter Flavor (Commercial Starter Distillate, Chumlea's Laboratories, Lebanon, Indiana) and 0.6 g. of potassium sorbate, (Mold Inhibitor-Chas. Pfizer and Co., New York, N.Y. were added. When the temperature of the milk reached 80° F., pH of the milk was 5.06.

Eight g. D-glucono-delta-lactone, an acidogen, was dissolved in 50 ml. of water; 15 ml. of 1/100 dilution of Hansen's Rennet Extract, Single strength, an enzyme, was added to the solution and thoroughly mixed. Eight g. D-glucono-delta-lactone per gallon of skim milk represents 0.205 percent by weight lactone. The resulting solution of acidogen and enzyme was immediately added to the milk heated to 80° F. and uniformly mixed. pH of the heated, acidified milk containing acidogen and enzyme was 5.06.

The heated, acidified milk was allowed to stand undisturbed in a quiescent state for 1 hour at 80° F. A cuttable cheese curd was formed. The curd was cut into ⅜-inch size cubes and allowed to stand for 15 minutes at 80° F. Shrinkage of the curd occurred and the whey was expressed. pH of the whey was 4.85.

The cut curd was stirred gently and cooked until the whey temperature was 110° F. after 30 minutes of cooking. A cooking rate of 1° F. per minute was obtained by regulating the water bath temperature so that it did not exceed the whey temperature by more than 20° F. When the whey temperature reached 110° F., pH of the whey was 4.70 and the curd was firm and shrunken in a normal manner without matting of the curd. Cooking and stirring was continued for a total of 50 minutes. The final cooking temperature was 130° F. Whey drained from the curd after cooking had a pH of 4.68.

The curd was washed and drained twice, first with 90° F. water and then with 70° F. water. Thereafter, the curd was washed with 66° F. water, allowed to stand for 15 minutes in the wash water and drained. Weight of the drained curd was 478 g. and the yield of curd was 12.2 percent. The product was a satisfactory cottage cheese curd.

EXAMPLE II

This example is directed to preparation of cottage cheese curd.

To 1 gallon of skim milk containing 8.8 percent by weight total solids and 0.01 percent by weight butterfat at 36° F. and having a pH of 6.80 was added at 39° F., with stirring, 14 ml. of 80 percent by weight lactic acid. pH of the acidified milk after lactic acid addition and mixing was 5.35.

The acidified milk was heated about 30 minutes, with stirring, to 80° F. in a water bath using the procedure described in example I above. When temperature of the milk reached 80° F., pH of the milk was 5.20.

Eighteen g. of D-glucono-delta-lactone, an acidogen, and 0.2 ml. of pure Rennet Extract (Hansen's Rennet Extract, Single Strength), an enzyme, were added to the heated milk at 80° F. and thoroughly mixed. pH of the acidified milk containing the acidogen and enzyme was 5.15.

The milk was allowed to stand undisturbed in a quiescent state for one hour at 80° F. A normal cuttable cheese curd formed. The curd was cut and the whey expressed. pH of the whey was 4.86. The cut curd was stirred gently and cooked until the whey temperature reached 97° F. after 30 minutes of cooking. pH of the whey was 4.64. Cooking and stirring was continued for another 30 minutes to obtain a whey temperature of 115° F. and a whey pH of 4.50. The whey temperature was 135° F. after cooking for an additional 15 minutes. Whey was drained from the curd. The curd was washed and drained. Weight of the drained curd was 585 g. and the yield of curd was 15 percent. The product was a satisfactory cottage cheese curd.

EXAMPLE III

This example is directed to preparation of baker's cheese.

To 1 gallon of commercial skim milk having a temperature of 42° F. and a pH of 6.78 was added, with stirring, 9.5 ml. of 85 percent phosphoric acid. The milk had the same composition as the milk used in example I. pH of the acidified milk after phosphoric acid addition and mixing was 5.05. The acidified milk was heated about 30 minutes, with stirring, to 80° F. in a water bath using the procedure described in example I above.

Ten g. of D-glucono-delta-lactone, an acidogen and 0.15 ml. of pure Rennet Extract (Hansen's Rennet Extract, Single Strength), an enzyme were added to the acidified milk at 80° F. and thoroughly mixed. pH of the acidified milk containing the acidogen and enzyme was 5.05.

The milk was allowed to stand undisturbed in a quiescent state for 1 hour at 80° F. A normal cheese curd formed and was broken up mechanically. pH of the whey was 4.75. The curd was allowed to set and the whey was expressed for 50 minutes. pH of the whey was 4.66. The curd was placed in a cloth bag and the bag was hung to drain for 1 hour. Intermittent pressure was used to help expel the whey. Weight of the drained curd was 450 g; moisture content of the curd was 73.5 percent and the yield of curd was 11.5 percent. The product was satisfactory for use as a baker's cheese curd.

EXAMPLE IV

This example is directed to preparation of cottage cheese curd outside the scope of this invention, that is, the initial acidification is too low (below pH 4.88) and an acidogen is not added.

To one gallon of commercial skim milk having a temperature of 37° F. and a pH of 6.79 was added, with stirring, 14 ml. of 85 percent phosphoric acid. pH of the acidified milk after acid addition and mixing was 4.67. The milk was heated, with stirring, for about 20 minutes to 45° F. in a water bath. Cottage cheese curd is usually cut between a pH of 4.6 and 4.8, hence this pH was adequate, i.e., low enough to produce cottage cheese curd. Therefore, no acidogen was introduced to further reduce the pH. Milk protein (casein) began to precipitate when the temperature of the acidified milk reached 45° F. An attempt to produce curd was made. twenty-hundredths ml. of pure Rennet Extract (Hansen's Rennet Extract, Single Strength-Chr. Hansen's Laboratory, Inc., Milwaukee, Wisc.) was added and mixed with the milk. The acidified milk containing the enzyme was allowed to stand undisturbed for 2 hours at 46°-55° F. A cheese curd did not form. Since raising the temperature to above 60° F. would have merely accelerated precipitation of milk protein from the milk, this experiment was discontinued at 46°-55° F.

EXAMPLE V

This example is directed to preparation of cottage cheese curd.

To one gallon of skim milk cooled to 42° F., containing 0.01 percent by weight of butterfat and having an as is pH of 6.75 and a titratable acidity of 0.17 percent, was added, with stirring, 9.5 ml. of 85 percent phosphoric acid diluted with 20 ml. of water. pH of the acidified milk after phosphoric addition was 5.00. Temperature of the acidified milk was 42° F.

The acidified milk was heated about 30 minutes, with stirring, to 80° F. in a water bath using the procedure described in example I above. When the temperature of the milk reached 80° F., pH of the milk was 5.02.

Twenty g. of heptonolactone, an acidogen, and 1.2 ml. of Hansen's Cottage Cheese Coagulator, an enzyme, in 40 ml. of water were added to the heated milk at 80° F. and thoroughly mixed. pH of the acidified milk containing the acidogen and enzyme was 5.02.

The milk was allowed to stand undisturbed in a quiescent state for 1 hour at 80° F. A normal cuttable cheese curd was formed. The curd was cut in ⅝-inch cubes and allowed to stand for 15 minutes. The cut curd was stirred gently and cooked until the whey temperature reached 120° F. after 30 minutes of cooking. pH of the whey was 4.85. Cooking with stirring was continued for an additional 30 minutes to obtain a whey temperature of 150° F. and a final whey pH of 4.40. The resulting cooked curd was an acceptable cottage cheese curd.

EXAMPLE VI

This example is directed to preparation of cottage cheese curd.

To one quart of skim milk having a temperature of 42° F. and a pH of 6.75 was added, with stirring, 3.2 g. of citric acid. The milk had the same composition as the milk used in example I. pH of the acidified milk after acid addition and mixing was 4.90. The acidified milk was heated to 80° F. using the procedure described in example I above.

2.25 g. of D-glucono-delta-lactone, an acidogen and 0.3 ml. of Hansen's Cottage Cheese Coagulator, an enzyme, were added to the acidified milk at 80° F. and thoroughly mixed. Cottage Cheese Coagulator is a diluted Rennet Extract. The milk was allowed to stand undisturbed in a quiescent state for 1 hour at 80° F. A satisfactory cheese curd was formed. The curd was cut, cooked, drained, washed, and drained using the procedure described in example I above to obtain a firm curd which was a satisfactory cottage cheese curd. The final whey pH was 4.50.

The procedure of example VI was repeated using each of the acids shown in table I instead of citric acid. All of the acids shown in table I gave acceptable cottage cheese curds. Individual acids produced curds which varied in firmness and cuttability but all curds were satisfactory.

TABLE I.—CHEESE CURDS PREPARED WITH VARIOUS ACIDS

| Acid | Acid added per qt. skim milk | Acidified milk pH | Final whey pH | Remarks |
|---|---|---|---|---|
| Malic | 4.20 g | 4.93 | 4.60 | Slightly weak curd, but cooks firm. Acceptable. |
| Acetic | 3.0 ml (glacial) | 4.90 | 4.70 | Very soft setting curd, but firm final curd. Acceptable. Slight acetic acid taste in curd. |
| Hydrochloric | 3.9 ml (20° Tech.) | 4.95 | 4.60 | Normal curd, cooks normal. Acceptable. |
| Sulfuric | 20 ml (2 normal) | 4.90 | 4.57 | Normal curd, cooks normal. Acceptable. Very bland taste. |
| Succinic | 4.0 g | 4.93 | 4.73 | Normal curd, firms normal. Acceptable. Sharp taste. |
| Formic | 3.4 ml (90%) | 4.95 | 4.48 | Medium firm initial curd and weak final curd. Acceptable. |

EXAMPLE VII

This example is directed to preparation of cottage cheese curd.

Twenty gallons of fresh skim milk was charged into a cheese vat. The skim milk had a temperature of 40° F., a total solids of 9.0 percent by weight, 0.01 percent by weight butterfat, an as is pH of 6.80 and a titratable acidity of 0.15 percent. Then 1,580 g. of Instant Nonfat Milk Solids (McCormicks, Baltimore, Maryland) was added to the milk and the mixture stirred to dissolve the milk solids. The resulting milk had a total solids of 11.5 percent by weight, a pH of 6.70 and a titratable acidity of 0.19 percent.

Two hundred and twenty-eight ml. of 85 percent food grade phosphoric acid representing 388 g. was diluted with 720 ml. of water. The diluted acid was stirred into the cold milk (40° F.) to obtain an acidified milk having a pH of 4.97. The acidified milk was then slowly warmed to 83° F. with stirring over 45 minutes. pH of the milk at 83° F. was 4.98.

Two hundred and sixteen g. D-glucono-delta-lactone food grade, an acidogen and 24 ml. Rennet Extract (Hansen's Cottage Cheese Coagulator), an enzyme in 800 ml. of water were added to the heated milk at 83° F. and thoroughly mixed. pH of the milk was 4.95. Then the milk was allowed to stand undisturbed in a quiescent state at 83° F. for 60 minutes. A normal cheese curd formed after the milk had stood at 83° F. for 60 minutes.

The curd was cut with ⅝-inch cheese knives and allowed to stand 15 minutes at 83° F. Whey was expressed. pH of the whey was 4.78. The cut curd was stirred and cooked until the whey temperature reached 144° F. after 55 minutes of cooking. Curds were normal, firm and no matting occurred. pH of the whey was 4.50. The curd was washed three times with chlorinated, acidified (pH 4.80) water to reduce the temperature of the curd to 85° F., then 40° F. and finally 37° F. in three steps. The washed curd was allowed to drain in the cheese vat for 45 minutes. pH of the washed, drained curd was 4.80. Weight of the curd was 31 lbs. representing a yield of 17.75 percent. Salt and cream dressing were added to the curd and the resulting finished cottage cheese was packaged and stored. The finished product after 3 weeks of storage at about 38° F. was a normal cottage cheese which was acceptable in appearance, taste and texture.

EXAMPLE VIII

This example is directed to preparation of cottage cheese curd.

Twenty gallons of fresh skim milk was charged into a cheese vat at 41° F. Then 3,160 g. of Instant Nonfat Milk Solids was added to the milk and the mixture stirred to dissolve the milk solids. The resulting milk had a total solids of 13.4 percent by weight, 0.01 percent by weight butterfat, a pH of 6.65 and a titratable acidity of 0.21 percent.

256.5 ml. of 85 percent food grade phosphoric acid representing 435 g. was diluted with 810 ml. of water. The diluted acid was stirred into the cold milk (41° F.) to obtain an acidified milk having a pH of 5.00. The acidified milk was then slowly warmed to 83° F. over 45 minutes. pH of the milk at 83° F. was 4.98.

Two hundred and forty-three g. D-glucono-delta-lactone food grade, an acidogen and 24 ml. of Rennet Extract, an enzyme in 800 ml. of water were added to the heated milk at 83° F. and thoroughly mixed. Then the milk was allowed to stand undisturbed in a quiescent state at 83° F. for 60 minutes. A normal medium firm cheese curd formed after the milk had stood at 83° F. for 60 minutes.

The curd was cut with ⅝-inch cheese knives and allowed to stand 15 minutes at 83° F. pH of the whey was 4.80. The cut curd was stirred and cooked until the whey temperature reached 140° F. after 55 minutes of cooking. Curds were normal, firm and no matting occurred. pH of the whey was 4.60. The curd was washed three times with chlorinated, acidified (pH 4.80) water to reduce the temperature of the curd to 88° F., then 49° F. and finally 37° F. in three steps. The washed curd was allowed to drain in the cheese vat for 45 minutes. pH of the washed, drained curd was 4.80. Weight of the curd was 34.5 lbs. representing a yield of 19.75 percent. Salt and cream dressing were added to the curd and the resulting finished cottage cheese was packaged and stored. The finished product after three weeks of storage at about 38° F. was normal and acceptable in all respects as cottage cheese, that is, appearance, taste and texture.

EXAMPLE IX

This example is directed to preparation of cottage cheese curd.

To 500 gallons of commercial skim milk having a temperature of 38° F. and a pH of 6.70 was added, with stirring, 5 quarts of 85 percent phosphoric acid. The phosphoric acid was diluted with 15 quarts of clean, cold water. Five quarts of phosphoric acid weighs 17.5 lb. and represents 0.4 percent by weight of 85 percent phosphoric acid in 500 gallons of skim milk (4,350 lbs.) pH of the acidified milk after acid addition and mixing was 4.90. The acidified milk was heated for about 70 minutes, with stirring, to 80° F. pH of the milk at 80° F. was 4.90. Ten lb. of D-glucono-delta-lactone, an acidogen and 42 ml. of pure single-strength Rennet Extract (Chr. Hansen's Laboratory, Inc.), an enzyme were dissolved in 20 quarts of water and were added to the heated milk at 80° F. and thoroughly mixed. pH of the acidified milk containing acidogen and enzyme was 4.90. The milk was allowed to stand undisturbed in a quiescent state for 65 minutes at 80° F. A cuttable, firm, satisfactory cheese curd formed after the milk had stood at 80° F. for 65 minutes.

The curd was cut and whey expressed. pH of the whey was 4.70. The cut curd was stirred gently and cooked until the whey temperature reached 100° F. after 90 minutes of cooking. pH of the whey was 4.60. Whey was drained and the curd washed three times using the procedure given in example VIII. Salt and dressing were added to the curd and the resulting cottage cheese packaged. The cottage cheese was normal and was acceptable in appearance and taste after 3 weeks of storage at about 38° F.

EXAMPLE X

This example is directed to preparation of cream cheese curd.

To 4 quarts of half milk and half cream having a temperature of 44° F. was added, with stirring, 8.5 ml. of 85 percent phosphoric acid diluted with 40 ml. of water. The half milk and half cream had a total solids of 19.5 percent, butterfat content of 10.5 percent, a pH of 6.52 before acidification and a pH of 5.00 after acidification. The acidified half milk and half cream was heated for 30 minutes, with stirring, to 80° F. pH of the heated, acidified cream-milk mixture was 5.03.

Ten g. of D-glucono-delta-lactone dissolved in 60 ml. of water was mixed with 1.2 ml. of Hansen's Cottage Cheese Coagulator and the resulting mixture was stirred into the heated, acidified half milk and half cream. Then the half milk and half cream was allowed to stand undisturbed in a quiescent state at 80° F. for 60 minutes. A heavy, firm curd formed.

The curd was cut and allowed to stand 10 minutes at 80° F. pH of the cut curd and whey was 4.78. The cut curd was stirred and cooked until the whey temperature reached 130° F. pH of the whey was 4.60. Then the cut curd was cooked at 130° F. for 15 minutes. The curd was cooled to 80° F. pH of the whey was 4.40.

Thirty-six g. of salt was added to the curd at 80° F. The curd was cooled to 60° F, poured into a cloth bag and drained overnight at 38° F. in a refrigerator. The curd was emptied from the cloth bag the next day. pH of the curd was 4.80. The curd was dry, soft and very slightly grainy. It was mixed in a Hobart blender (The Hobart Manufacturing Co., Troy, Ohio) with sufficient lactic acid to reduce pH of the curd to 4.60 and to blend the curd into a smooth homogenous mass. The homogenized curd was packaged and refrigerated to obtain a product which had the same appearance, taste and texture as a cultured cream cheese.

Neufchatel cheese can be produced by this process by using a cream-milk mixture containing about 5–6 percent fat instead of the 10.5–11.5 percent used herein.

What is claimed is:
1. A cheese making process consisting essentially of
   a. acidifying milk at about 32° F. to about 45° F. with from abut 0.3 to about 0.5 parts by weight of free acid per 100 parts by weight of milk to obtain an acidified milk with a pH of about 4.88 to about 5.35,
   b. heating said acidified milk from just in excess of 60° F. to about 100° F. for from about 30 minutes to about 90 minutes to obtain a heated acidified milk,
   c. adding (i) from about 0.1 to about 0.5 parts by weight of nonbacterial acidogen based on 100 parts by weight of said milk, and (ii) from about 0.001 to about 0.05 parts by weight of proteolytic enzyme based on 100 parts by weight of said milk, to said heated acidified milk, and
   d. allowing said heated, acidified milk containing said nonbacterial acidogen and said enzyme to remain in a quiescent state at from just in excess of 60° F. to about 100° F. for from about 30 minutes to about 90 minutes to obtain a cuttable acid cheese curd suitable for making cottage cheese, baker's cheese, cream cheese and Neufchatel cheese.

2. A process according to claim 1 with the additional steps of
   e. cutting the said cuttable acid cheese curd into cubes,
   f. expressing the whey from said curd,
   g. cooking and stirring said curd for from about 30 minutes to about 90 minutes at a temperature of from about 100° F. to about 150° F., and
   h. washing and draining said curd to obtain a cottage cheese curd.

3. A process according to claim 1 with the additional steps of
   e. breaking up said cuttable acid cheese curd,
   f. setting said curd and expressing the whey therefrom, and
   g. hanging and draining said curd for about 1 hour to help express further whey, to obtain a baker's cheese curd.

4. A process according to claim 1 with the additional steps of
   e. cutting the said cuttable acid cheese curd,
   f. cooking and stirring said curd until the whey temperature reaches about 130° F. and then continuing cooking for about 15 minutes additionally,
   g. cooling said curd to about 60° F.,
   h. draining said curd overnight at about 38° F. to obtain a dry, soft curd, and
   i. mixing said dry, soft curd with sufficient lactic acid to reduce the pH of the curd to 4.60 and blending said curd into a smooth homogeneous cheese mass, with the proviso that the milk of step (a) is half milk and half cream so as to have a fat content of
      i. from about 5 to about 6 percent for the production of Neufchatel cheese, or
      ii. from about 10.5 to about 11.5 percent for the production of cream cheese.

5. The process of claim 1 wherein said milk is acidified with phosphoric acid.

6. The process of claim 1 wherein said milk is acidified with lactic acid.

7. The process of claim 1 wherein said acidogen is D-glucono-delta-lactone.

8. The process of claim 1 wherein skim milk at about 38° F. is acidified to about a pH of about 4.90 with phosphoric acid, heated to about 80° F. during a period of about 60 minutes, adding D-glucono-delta-lactone and rennin to the heated, acidified milk and allowing the heated acidified milk containing D-glucono-delta-lactone and rennin to remain in a quiescent state for about 65 minutes at about 80° F. thereby obtaining a cuttable cottage cheese curd.

* * * * *